United States Patent

[11] 3,578,242

[72] Inventor  Donald H. Spethmann
               Arlington Heights, Ill.
[21] Appl. No. 854,937
[22] Filed     Sept. 3, 1969
[45] Patented  May 11, 1971
[73] Assignee  Honeywell, Inc.
               Minneapolis, Minn.

[54] PNEUMATIC AIR-CONDITIONING CONTROL SYSTEM
     5 Claims, 1 Drawing Fig.
[52] U.S. Cl. ............................................. 236/1
[51] Int. Cl. ........................................ G05d 23/19
[50] Field of Search .................................... 165/16;
                                                  236/1 (C)

[56]              References Cited
              UNITED STATES PATENTS
2,290,013  7/1942  Barnett ........................  236/1C
3,170,508  2/1965  Avery ..........................  236/1CX Primary Examiner—Edward J. Michael
Attorneys—Lamont B. Koontz and Francis A. Sirr ABSTRACT: A pneumatic control system controlling sequentially operable valves, including a pressure-responsive pneumatic switch operable in response to the operation of the central fan or blower of the air-conditioning system. This switch connects the thermostat to the valves when the blower or fan is operating, connects a pressure reducing valve to the valves of the air-conditioning system when the fan is not operating, and provides a control pressure suitable for holding the valves in the desired position for nonoperation.

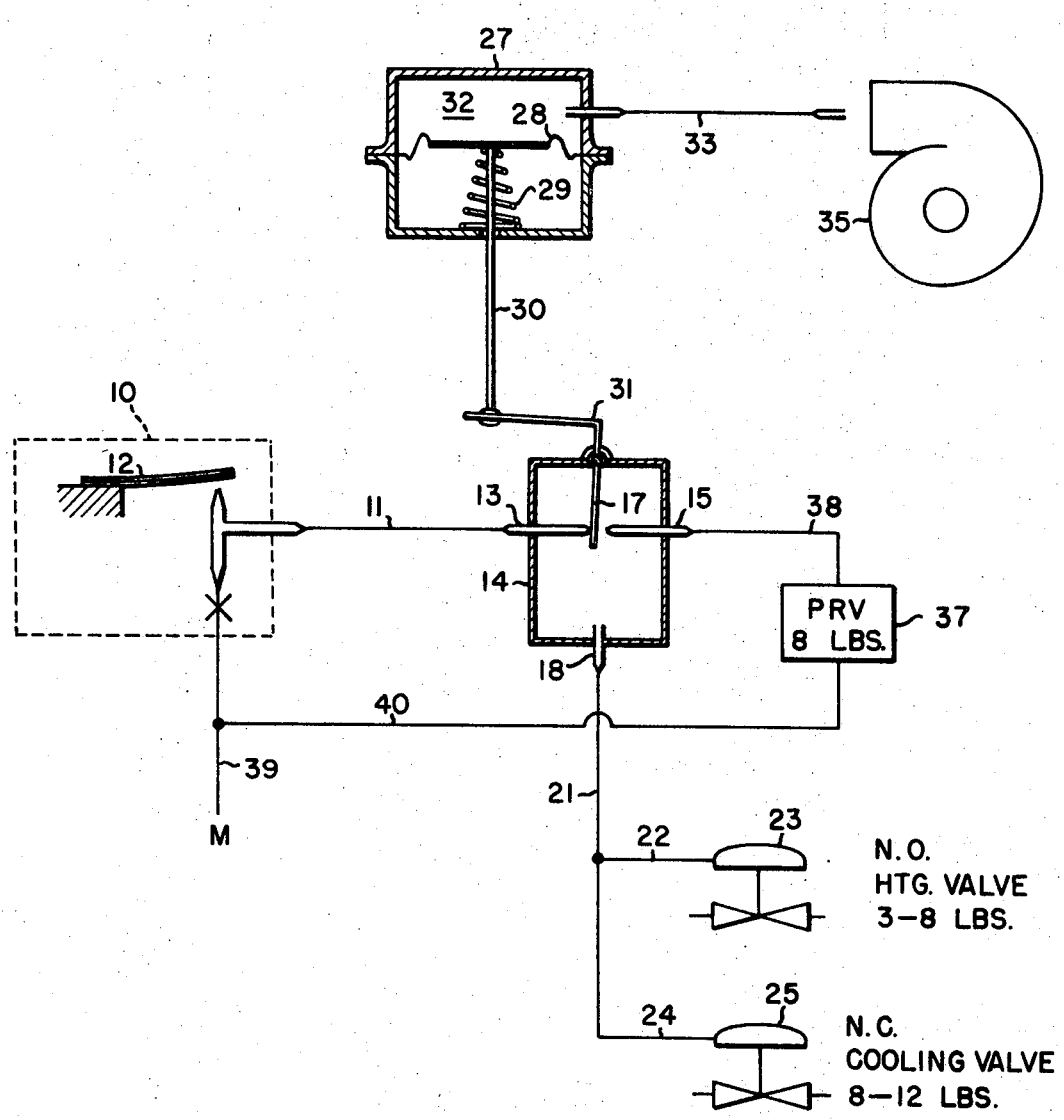

PNEUMATIC AIR-CONDITIONING CONTROL SYSTEM

This invention relates to a pneumatically controlled air-conditioning control system wherein it is desired to maintain, under selected circumstances, one or more valves in desired positions by imposing pressure thereon other than atmospheric. For instance, in an arrangement wherein heating and cooling control valves are controlled in sequence from the branch line of a single thermostat, it has been difficult to arrange for both valves closing when, for instance, the circulating fan shuts down. According to this invention, the branch line from the control device to the valves is controlled by a pneumatic switch that, in one position, connects the branch line to the valves and, in its other position, connects a preset pressure regulator to the valves.

For a more detailed description of the present invention, reference is made to the accompanying drawing wherein:

The single FIG. schematically shows a pneumatic control system embodying the present invention.

In the drawing, the control system is shown with only the portions of the air-conditioning system affecting or being affected by the temperature control system. Referring to said drawing, thermostat 10 is of a conventional bleed type wherein the pressure in its branch line 11 is proportional to the temperature affecting bimetal 12. The pressure in branch line 11 normally varies between 3 and 13 pounds per square inch as the bimetal moves from a fully opened to a substantially closed position, relative to the nozzle of the thermostat 10. Branch line 11 connects to a port or nozzle 13 of a three-way valve or pneumatic switch 14. Switch 14 has another nozzle or port 15 arranged opposite to 13 and a pivoted blade or flapper 17, seal not shown, is arranged to close either nozzle 13 or 15. A port or opening 18 in the bottom of switch 14 constitutes a common connection for the switch. Pipe 21, connected to 18, connects through pipe 22 to a normally open heating valve 23 of the air-conditioning system above mentioned. This valve is normally open at control pressures under 3 pounds per square inch and gradually moves to a closed position as the pressure increases to 8 pounds per square inch. Pipe 21 is also connected by pipe 24 to normally closed valve 25. Valve 25 is used to control the supply of cooling fluid to the air-conditioning system and is also arranged to be closed at 8 pounds per square inch, gradually moving to an open position as the control pressure increases to 12 pounds per square inch.

Pneumatic switch 14 is operated by a pressure-responsive device 27 which includes a flexible diaphragm 28, a light spring 29 biasing the diaphragm 28 upwardly, and a connecting link 30 connected to crank 31 which in turn is connected to flapper or blade 17 of switch 14. Generally, device 27 and switch 14 are built as an assembly. As shown, when no pressure is applied to chamber 32 above diaphragm 28, spring 29 urges diaphragm 28 upwardly and tends to rotate crank 31 in a clockwise direction thus causing flapper 17 to close nozzle 13. This leaves nozzle 15 open. Chamber 32 is connected by pipe 33 to the outlet of blower 35, blower 35 being the circulating fan of a unit ventilator or the central fan of an air-conditioning system. The pressure supplied through 33 to 32 is the discharge pressure of the blower. Obviously device 27 is so arranged that the pressure obtainable from the blower 35 is sufficient to force diaphragm 28 down against spring 29 and to rotate lever 31 in a counterclockwise position, thereby causing blade 17 to close nozzle 15 and open nozzle 13. Of course, when blower 35 stops operating due to means not shown, the apparatus again resumes the position indicated. Obviously, device 27 may be made to respond, on the lower side of 28, to blower inlet pressure and thus gain some additional force. To complete the apparatus of the invention, pressure-reducing valve 37 is connected by pipe 38 to nozzle 15 and is supplied by air from main 39 by pipe 40. Three pressure reducing valve 37 is of a conventional sort and, for the purpose of this disclosure, is set for 8 pounds per square inch. This value is chosen because it is the one at which both valves 23 and 25 are closed. Obviously, the valves could be arranged to be closed at some other pressure and in this event valve 37 would be arranged to provide such other pressure.

OPERATION

In the drawing, the apparatus shown is quiescent; that is, the blower 35 is not operating, and the temperature affecting bimetal 12 of thermostat 10 is relatively low. The thermostat is therefore bleeding air to the atmosphere and is thus providing a minimum pressure to branch line 11. However, this pressure does not affect valves 23 or 25 because blade 17 is in a closed position relative to nozzle 13. Assume now that the blower 35 is energized to start up the air-conditioning system. Then the discharge pressure of the blower is supplied through pipe 33 to chamber 32 and forces diaphragm 28 downwardly against spring 29 and causes blade 17 to move to a position closing nozzle 15 and opening 13. Thermostat 10 is then able to effect normal control of valves 23 and 25 through the pressure imposed on these valves through branch line 11, nozzle 13, connection 18, pipe 21, and pipes 22 and 24. When the air-conditioning apparatus is again shut down, the pressure in chamber 32 goes to atmospheric by leakage back through line 33, spring 29 forces diaphragm 28 upwardly, and flapper 17 moves to a position closing nozzle 13 as shown in the drawing. This leaves a connection from main 39 through 40, through pressure-reducing valve 37, and through pipe 38 into nozzle 15 which is open and thus permits the reduced pressure, or 8 pounds per square inch of the pressure-reducing valve, to be imposed on valves 23 and 25 through connection 18, pipe 21 and pipes 22 and 24. Since both of the valves have been constructed to close when subjected to an 8 pound per square inch pressure, they are both maintained in a closed position during the time the air-conditioning apparatus is shut down.

I claim:

1. In an air-conditioning pneumatic control system,
    valve means for controlling the flow of condition-changing fluid, said valve means being operable from one position to another by pressure varying over a predetermined range,
    a condition-responsive control device operable to provide a control pressure indicative of a need for actuating said valve means, said device being capable of supplying a control pressure over a range at least as extensive as the predetermined range of said valve means,
    a pressure-reducing means set to provide an output pressure corresponding to the pressure needed to actuate said valve means to a predetermined position,
    pneumatic switching means operable from one position to another in response to operation of the air-conditioning system,
    and means operably connecting said condition-responsive means through said pneumatic switching means to said valve means when said switching means is in one of its positions determined by the state of operation of said air-conditioning system and connecting said pressure-reducing means through said switch to said valve means when said switch means is in its other position.

2. The apparatus of claim 1 wherein said valve means comprises a valve operable to a preselected position corresponding to a pressure within the normal range of pressures obtainable from the condition-responsive means.

3. The apparatus of claim 1 wherein the valve means comprises a plurality of valves wherein one valve is operated from normally open to closed upon increase in control pressure and wherein another valve is operated from a closed position to open as the control pressure continues to rise.

4. The apparatus of claim 3 wherein:
    the pressure-reducing means comprises a pressure-reducing valve; and
    the predetermined position of the valve means is a closed position;
    whereby, the output pressure of the pressure-reducing valve establishes both said one valve and said another valve in closed positions.

5. The apparatus of claim 4 wherein said condition-responsive control device comprises a temperature control device.